United States Patent [19]
Peters

[11] 4,445,636
[45] May 1, 1984

[54] TEMPERATURE COMPARISON APPARATUS AND METHODS

[75] Inventor: Donald Peters, Westfield, Mass.

[73] Assignee: American Stabilis, Inc., Lewiston, Me.

[21] Appl. No.: 411,284

[22] Filed: Aug. 25, 1982

[51] Int. Cl.³ .............................................. F24D 3/00
[52] U.S. Cl. ............................... 236/20 R; 236/91 F; 237/8 R
[58] Field of Search ................ 236/91 F, 91 G, 91 D, 236/20 R; 62/209; 374/115, 179; 237/8 R

[56] References Cited

U.S. PATENT DOCUMENTS 2,547,933 4/1951 Fitzgerald .......................... 236/91 F
3,995,810 12/1976 Banks ................................. 236/91 F Primary Examiner—William E. Wayner
Attorney, Agent, or Firm—Finnegan, Henderson, Farabow, Garrett and Dunner

[57] ABSTRACT

A temperature comparison apparatus contains current-producing temperature sensors to measure outdoor temperature and heater temperature, a summing circuit to add the output currents from the sensors and a comparator circuit to compare the sum of the sensor currents to a presettable reference value.

12 Claims, 2 Drawing Figures

TEMPERATURE COMPARISON APPARATUS AND METHODS

BACKGROUND OF INVENTION

The source of heat for many homes is hot water and the temperature of that water determines the amount of heat distributed. It is well-known that as the outdoor temperature rises, the temperature of the hot water needed for heating a home can decrease. A heating system can save energy by lowering the indoor water temperature when the outdoor temperature rises.

Heating systems which take advantage of this fact to save energy require an outdoor temperature sensor, a water temperature sensor, and some mechanism to convert the signals from those sensors into a control signal for the hot water heater.

Certain heating systems, in particular the ones described in U.S. Pat. No. 3,604,957 to Satula and U.S. Pat. No. 3,995,810 to Banks, use forward-biased diodes to measure the outdoor temperature and the water temperature. Over a limited temperature range and with constant current, the voltage across a p-n junction varies linearly with temperature. Satula and Banks compare a present voltage level to the sum of the voltages across the temperature sensing diodes. The result of the comparison is used to control the water heater.

Although these and similar apparatuses are in common use, they have several disadvantages which have plagued this type of heating system for a long time. Some of the disadvantages stem from the small voltage signals produced by diode sensors. The change across a p-n junction is only about $-2mv/°K$ for a silicon device. Usually, many diodes must be connected in series to measure temperatures reliably.

The more serious problem which results from the diodes' small voltage signals is that the signals from the sensors are highly susceptible to interference. The low voltage signals at remote sensors can only detected by a very sensitive receiver. Unfortunately, the more sensitive the receiver, the more likely it is to detect noise signals and mistake them for valid signals.

In addition, the outdoor sensors for such systems cannot be placed too remote from the receiver because line losses between the sensor and receiver reduce the magnitude of the sensor signals and they may become undetectable. This problem can be solved by amplifying the signals at the diode sensor or by using the sensor signals to modulate a carrier signal. These solutions, however, significantly increase the price and complexity of the system.

Another disadvantage inherent with diode temperature sensors is that the temperature characteristics of diodes tend to vary substantially. For each diode sensing water temperature controller, the diodes must be carefully chosen. Their temperature characteristics must not only match each other, a task which becomes increasingly difficult as more diodes are added to increase the sensor signal, but also the diodes must match the characteristics of the receiver.

After the diodes are matched, resistance values in the system must be calculated and resistors individually selected depending, among other things, on the diodes' characteristics and the distance between the diodes and the receivers.

Since this procedure must be followed for each water temperature controller manufactured, the production of controllers using diode temperature sensors is slow and expensive.

SUMMARY OF INVENTION

Accordingly, it is an object of this invention to measure remote temperatures for a hot water temperature control system accurately and with a minimal amount of remote sensor circuitry.

A further object of this invention is to measure such remote temperatures while minimizing the effects of electromagnetic noise.

It is also an object of this invention to minimize the amount of component matching and calibration required for a hot water temperature control system.

The present invention overcomes the problems of the diode temperature sensing system by using temperature sensors which produce a current that varies linearly with temperature.

Additional objects and advantages of the invention will be set forth in part in the description which follows, and in part will be obvious from the description, or may be learned by practice of the invention. The objects and the advantages of the invention may be realized and obtained by means of the instrumentalities and combinations particularly pointed out in the appended claims.

To achieve the objects, and in accordance with the purposes of the invention, as embodied and broadly described herein, the temperature comparison apparatus of this invention comprises: first temperature sensing means for supplying a current proportional to temperature of a first source; second temperature sensing means for supplying a current proportional to temperature of a second source; summing means for providing a first signal proportional to the sum of the currents from the first temperature sensing means and the second temperature sensing means; and comparator means connected to a preset reference level for producing a second signal indicating the relationship between the first signal from the summing means and the preset reference level.

In addition, the method of comparing temperatures of this invention comprises: adding the currents from first and second current-producing temperature sensing means; producing a first signal proportional to the sum of the currents; comparing the first signal to a preset reference level; and producing a second signal indicating the relationship between the first signal and the preset reference level.

The accompanying drawings, which are incorporated in and which constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

For purposes of illustration of the invention, the apparatus will be described in relation to a residential heating system which uses hot water heating, with the understanding that the invention is not limited to residential heating systems nor is it limited to hot water heating systems.

In such a system, a burner heats water in a storage tank. The burner fuel is usually gas, oil or coal. The hot water circulates through the storage tank to heat diffusing devices, such as radiators, and then back to the storage tank.

In this type of residential heating system, the temperature of the ambient air in the residence is a function both of the temperature of the radiators, i.e., of the circulating hot water, and of the temperature of the outside air surrounding the residence. Accordingly, the temperature comparison device of this invention contains one temperature sensor to measure the temperature of the water in the heating system and another temperature sensor located outside the house near an outer wall to measure the outdoor temperature.

The temperature comparison device of this invention automatically sums the measured temperatures and compares that sum with a preset reference value. The result of the comparison determines whether heat is supplied to raise the temperature of the water in the system.

Figure 1:
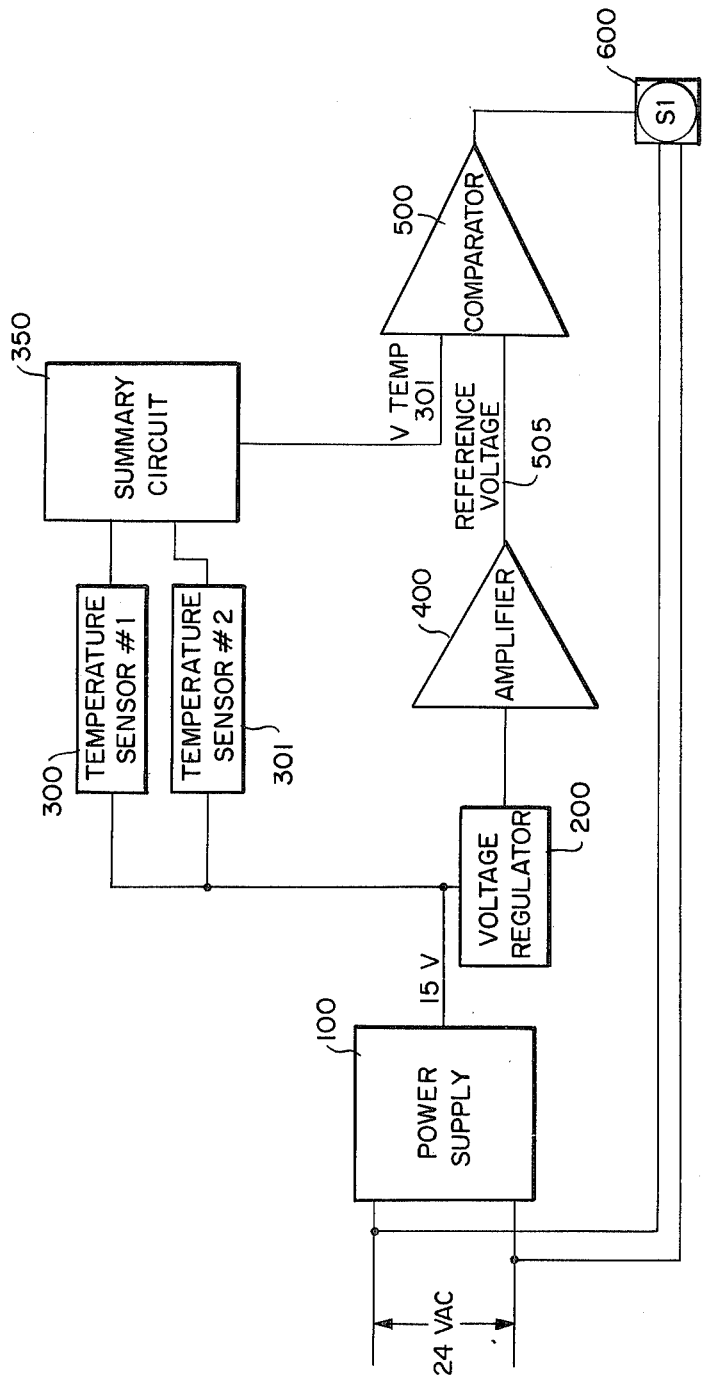
FIG. 1 is a general block diagram of the temperature sensing and comparison circuit of the invention.
Figure 2:
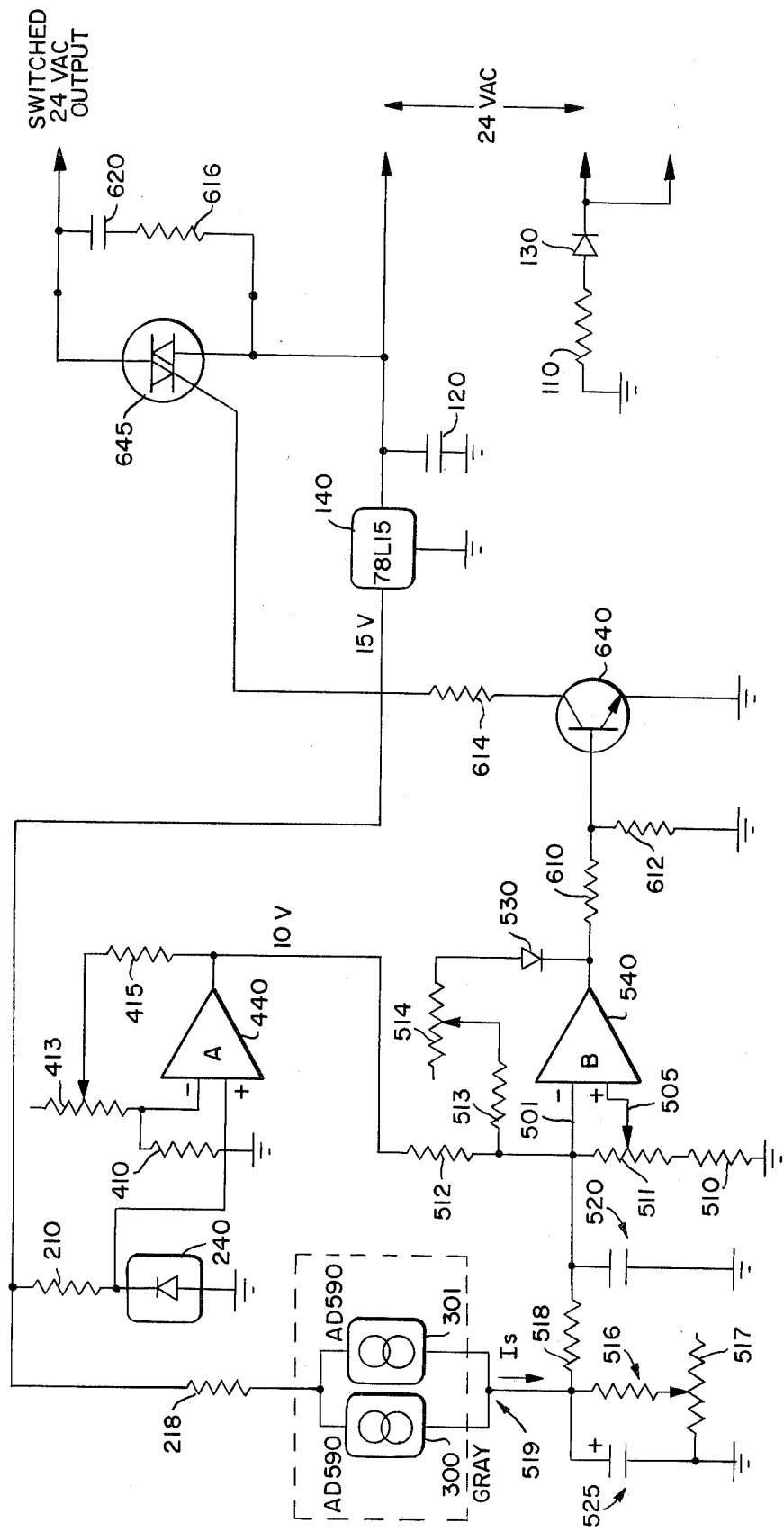
FIG. 2 is a schematic drawing of the circuit of FIG. 1.

In accordance with the invention, the temperature comparison apparatus includes a first temperature sensing means for supplying a current proportional to the temperature of a first source and a second temperature sensing means for supplying a current proportional to the temperature of a second source. As herein embodied, both the first and second temperature sensing means are integrated circuit temperature sensors 300 and 301, as seen in FIGS. 1 and 2.

The current outputs of sensors 300 and 301 vary linearly with the temperature that they are sensing. One commercially available device which can be used for this sensor is an AD590 manufactured by Analog Devices, Rte. One Industrial Park, Norwood, Mass. 02062. This device is described in Timko, A Two Terminal IC Temperature Transducer, IEEE Journal of Solid-State Circuits, Vol. SC-4, No. 6 (Dec. 1976). In the preferred embodiment, one temperature sensor sits outside the house on an exterior wall and the other sensor is in intimate contact with the hot water in the heating system.

One terminal of both temperature sensors 300 and 301 is connected to an internal 15 volt supply through current-limiting resistor 218. The other terminal of each sensor connects to the summing circuit.

The use of the current-producing temperature sensors avoids the problems of diode temperature sensors. First, the receivers detecting the sensor output need not be as sensitive as they must be for the diode sensors because the current signal from the AD590 sensors is larger and easier to detect, than is the small diode voltage signal.

Second, the current output from the AD590 sensors is less susceptible to changes in line length, line resistance, and outside electromagnetic interference than is a comparable diode voltage signal. Thus the current output from the sensors is a more accurate and more reliable signal than is the voltage signal from a forward-biased diode.

In accordance with the invention, a summing means provides a first signal proportional to the sum of the currents from the first temperature sensing means and the second temperature sensing means. As herein embodied, the summing means includes summing circuit 350 seen in FIG. 1.

The summing circuit is seen in more detail in FIG. 2. The currents from both temperature sensors add together at node 519. A current $I_s$, equalling the sum of the currents from the sensors and being proportional to the sum of the indoor and outdoor temperatures, flows from node 519. Essentially all of current $I_s$ flows through resistor 516 and variable resistor 517 to ground because not much current flows through the capacitors or into amplifier 540.

The voltage produced across resistors 516 and 517 is proportional to the sum of the currents from temperature sensors 300 and 301 and hence to the sum of the indoor and outdoor temperatures. Capacitors 520 and 525 filter unwanted A.C. signals from this voltage, which is inputted, via resistor 518, to the noninverting input of amplifier 540 as signal 501.

In accordance with the invention, a comparator means, connected to a present reference level, produces a second signal indicating the relationship between the first signal from the summing means and the preset reference level. As herein embodied, the comparator means includes comparator 500 seen in FIG. 1.

In FIG. 2, it can be seen that comparator 500 includes a differential amplifier comparator 540 with a feedback circuit consisting of resistors 513 and 514 and diode 530. Signal 501 from the summing means connects to differential amplifier 540's inverting input. Preset reference level 505 connects to the noninverting input of amplifier 540.

In the illustrated embodiment, the reference voltage level 505 is provided by reference voltage regulator 200 and amplifier 400, as seen in FIG. 1. FIG. 2 shows in greater detail that reference voltage regulator 200 includes voltage reference source 240. In the preferred embodiment, source 240 is a 6.9 volt reference, model LM329, manufactured by National Semiconductor. Resistor 210 is connected between the internal 15 volt power and the voltage reference source 240 to set the operating current needed to produce the correct voltage output from reference source 240.

This voltage reference is boosted by amplifier 400, as shown in FIG. 1. Amplifier 400 includes DC operational amplifier 440. The gain of amplifier 440 is determined by resistors 410, 415 and variable resistor 413. Variable resistor 413 is adjusted so that the output of amplifier 440 is ten volts.

This 10 volt reference is connected to the comparator means via a voltage divider circuit consisting of resistors 512 and 510 and variable resistor 511. The reference voltage input 505 to comparator 500 and differential amplifier 540 is the voltage at the wiper arm of variable resistor 511.

Reference voltage 505 is preset by adjusting variable resistor 511. Reference level 505 can be adjusted between 8 and 9 volts, which corresponds roughly to temperatures between 100° F. and 220° F. This reference voltage can be increased or decreased whenever more or less heat is desired. In a residential heating system, variable resistor 511 would be the temperature setting on a thermostat and would be calibrated in degrees rather than in volts.

When the combined temperatures at sensors 300 and 301 decreases, for example because the outside temperature has dropped, the sum of the currents from the sensors also decreases and, therefore, so does signal level 501.

When signal level 501 drops below the voltage reference level 505, the comparator's output switches to the high voltage state.

This change in state is not immediately fed back to the input because diode 530 blocks this high voltage from the noninverting input. The reverse-biasing of diode 530 in turn causes the voltage at the noninverting input, voltage reference 505, to increase because no current is flowing through resistors 513 and 514 in the feedback circuit.

This voltage rise results in hysteresis in the comparator. When the sum of the temperatures rises again, the voltage signal representing that sum, signal 501 at the inverting input, must exceed the value of the increased voltage reference 505 before the output of the differential amplifier switches back to the low voltage state. This hysteresis prevents the comparator output from oscillating while the outdoor and hot water temperatures ar stable (i.e., when the voltage reference level 501 is approximately the same as the signal level 505).

In accordance with the invention, the signal from the comparator means activates the switching means. As herein embodied, the switching means includes switch S1, labelled as 600 in FIG. 1.

In FIG. 2, the switching means is displayed in greater detail. The output of the amplifier 540 is connected through a voltage divider network of resistors 610 and 612 to the base of transistor 640, such that the base voltage is the voltage across resistor 612. When the comparator is in the high voltage state, indicating that the sum of the temperatures is below the reference value and that the the water in the system must be heated, the voltage at the base of transistor 640 saturates that transistor.

Transistor 640 supplies a gate current to triac 645 through a current-limiting resistor 614. When transistor 640 saturates, this gate current activates triac 645 which then switches 24 VAC from an external supply to the water heater. Capacitor 620 and resistor 616 comprise a snubber network to ensure that the triac will turn off when driving inductive loads.

When the sum of the temperatures exceeds the reference value (which has been increased by the hysteresis), the comparator goes into the low voltage state which cuts off transistor 640, thereby turning off the gate current to triac 645. Triac 645 stops conducting during the next half cycle of the 24 VAC input voltage.

Power supply 100, seen in FIG. 1, converts 24 VAC to 15 VDC for the temperature comparison apparatus of this invention. FIG. 2 shows the power supply circuit in greater detail. Diode 130 rectifies the input voltage and capacitor 120 helps filter it for power supply voltage regulator 140. Voltage regulator 140, in the preferred embodiment, is a commercial 15 volt voltage regulator model number 78L15 manufactured by National Semiconductor. Regulator 140 converts the rectified input voltage to 15 VDC for use by the temperature probes, the reference voltage regulator and by the integrated circuits of the temperature comparison apparatus. Resistor 110 limits the current into the voltage regulator.

The following table contains the preferred values for the components in the circuit of FIG. 2:

| Resistors | |
| --- | --- |
| 110 | 150 ohm |
| 210 | 2.7 kohm |
| 218 | 4.7 kohm |
| 410 | 10 kohm |
| 415 | 3.6 kohm |
| 510 | 8.375 kohm |
| 512 | 1.042 kohm |
| 516 | 14.206 kohm |
| 518 | 4.7 kohm |
| 610 | 22 kohm |
| 612 | 33 kohm |
| 614 | 3.3 kohm |
| 616 | 120 ohm |
| Variable Resistors | |
| 413 | 1 kohm |
| 511 | 1 kohm |
| 514 | 50 kohm |
| 517 | 1 kohm |
| Capacitors | |
| 120 | 47 ufd |
| 520 | 47 ufd |
| 525 | 10 ufd |
| Diodes | |
| 130 | IN4004 |
| 530 | IN4150 |
| Other | |
| 440 | LM358 |
| 540 | LM358 |
| 640 | 2N4400 |
| 645 | TR-1 |

The temperature control device described above is relatively simple to manufacture largely because the current-producing probes need not be specially selected or matched. Also the calibration of the system is minimal. First the temperature sensors are placed at a known temperature. Then resistors 413, 511 and 514 are set to produce a reference voltage input which corresponds to the temperature at which the probes are set. Finally, resistor 517 is adjusted to provide a voltage at the inverting input which is equal to the reference input. This simple procedure makes the production and manufacture of these temperature control devices inexpensive and fast.

Those skilled in the art will be aware that various modifications can be made to the temperature comparison apparatus of this invention, especially in the voltage reference and comparison circuits. This invention is intended to cover those modifications provided that they come within the scope of the appended claims.

What is claimed is:

1. A temperature comparison apparatus comprising:
    first temperature-sensing means for supplying a current proportional to the temperature of a first source;
    second temperature-sensing means for supplying a current proportional to the temperature of a second source;
    summing means for providing a first signal proportional to the sum of the currents from said first temperature-sensing means and said second temperature-sensing means; and
    comparator means connected to a preset reference level for producing a second signal indicating the relationship between said first signal from said summing means and said preset reference level.

2. The apparatus in claim 1 wherein said first and second temperature-sensing means include integrated circuit temperature sensors.

3. The apparatus in claim 2 wherein said summing means includes a circuit having a resistor coupled to said first and second temperature sensing means, the current through said resistor producing a voltage proportional to the sum of the currents from said first and second temperature-sensing means.

4. The apparatus in claim 3 wherein said comparator means is a differential amplifier.

5. The apparatus of claim 1 or 4 wherein said second signal from said comparator means is in a first state when said first signal from said summing means is greater than said preset reference level and said second signal is in a second state when said first signal is smaller than said preset reference level.

6. The apparatus in claim 5 wherein said comparator means contains hysteresis means.

7. The apparatus in claim 1, including a switching means for switching power to a water-heating device, said switching means being activated by said second signal from said comparator means.

8. The apparatus in claim 7 wherein said switching means includes a semiconductor triac.

9. A method of comparing temperatures comprising:
adding the currents from first and second current-producing temperature sensors;
producing a first signal proportional to the sum of said currents;
comparing said first signal to a preset reference level; and
producing a second signal indicating the relationship between said first signal and said preset reference level.

10. The method of comparing temperatures in claim 9 also including the step of:
controlling a switch with said second signal.

11. The method of comparing temperatures in claim 9 wherein the step of producing a second signal includes the steps of:
switching said second signal to a first state when said first signal is greater than said preset reference level; and
switching said second signal to a second state when said first signal level is smaller than said preset level.

12. The method of comparing temperatures in claim 11 wherein the step of switching said second signal includes the step of:
switching said second signal back to said first state when said first signal is greater than the sum of said preset reference level and a threshold value.

* * * * *